ABSTRACT# United States Patent [19]

Ishii

[11] Patent Number: 4,566,201
[45] Date of Patent: Jan. 28, 1986

[54] DIGITAL INDICATING TYPE DIMENSION MEASURING INSTRUMENT

[75] Inventor: Munenori Ishii, Tochigi, Japan

[73] Assignee: Mitutoyo Mfg. Co., Ltd., Tokyo, Japan

[21] Appl. No.: 588,859

[22] Filed: Mar. 12, 1984

[30] Foreign Application Priority Data

Mar. 16, 1983 [JP] Japan .................................. 58-44652

[51] Int. Cl.[4] ............................. G01B 3/22; G01B 7/02
[52] U.S. Cl. ................................ 33/172 E; 33/DIG. 6
[58] Field of Search ........... 33/172 R, 172 E, DIG. 2, 33/DIG. 6; 73/430

[56] References Cited

U.S. PATENT DOCUMENTS 2,527,173  10/1950  Boat ................................ 33/DIG. 6
3,721,010   3/1973  Ristow ............................. 33/172 R
3,975,829   8/1976  Possati ............................ 33/DIG. 6

FOREIGN PATENT DOCUMENTS 801412   1/1951  Fed. Rep. of Germany .... 33/172 R
190208  11/1982  Japan ................................ 33/172 R
363446  12/1931  United Kingdom ........... 33/DIG. 6

Primary Examiner—Richard R. Steams
Attorney, Agent, or Firm—Flynn, Thiel, Boutell & Tanis

[57] ABSTRACT

This invention relates to a digital indication type dimension measuring instrument provided with a shock absorbing mechanism for controlling an overspeed of a spindle. The shock absorbing mechanism is provided with a pressure adjusting device which comprises a valve chamber having a communication hole communicated with a pressure chamber in a cylinder, an open hole communicated with the atmosphere and a ball valve for suitably opening or blocking the communication hole. When the spindle is inclined to a predetermined angle of inclination or more, the ball valve opens the communication hole to release a pressure fluid in the cylinder to the atmosphere.

8 Claims, 4 Drawing Figures

DIGITAL INDICATING TYPE DIMENSION MEASURING INSTRUMENT

BACKGROUND OF THE INVENTION

1. Field of the Invention

This invention relates to a digital indication type dimension measuring instrument, and more particularly to improvements in a shock absorbing mechanism provided for stabilizing a displacement speed of a spindle and controlling an overspeed.

2. Description of the Prior Art

There has heretofore been known a digital indication type dimension measuring instrument in which a displacement value of a spindle is detected by a displacement detection portion, such as a photoelectric encoder and a magnetic encoder, and a dimension, a position and the like of a workpiece to be measured are digitally indicated. In the digital indication type dimension measuring instrument of the type described, even if an encoder of any type would be used as the displacement detection portion, there should be a limit in detectable speed due to circuitry economics or other. For this reason, it becomes necessary to provide a shock absorbing mechanism for preventing the overspeed of the spindle. Furthermore, in order to prevent a measuring element at the forward end of the spindle from crashing into the workpiece so as to provide a safe and high precision measuring, and further to stabilize or uniformalize a displacement speed of the spindle, it is necessary to provide the shock absorbing mechanism. As the shock absorbing mechanism as described above, mention may be made to a dashpot type shock absorbing mechanism which acts against a resilient biasing force when the spindle is resiliently biased in a predetermined direction. When a dashpot type shock absorbing mechanism is used, it is particularly advantageous in stabilizing a displacement speed of the spindle.

However, the conventional dashpot type shock absorbing mechanism has been designed on the basis of the case where the spindle is held in an erected state and dropped vertically. In consequence, when the spindle is levelled or tilted in the use, the gravity effect on the spindle disappears or is reduced, whereby the shock absorbing mechanism excessively acts as compared with the resilient biasing force, thus resulting in an excessively slow displacement speed of the spindle.

For the above-described reason, a period of time, for which the measuring element provided on the spindle comes into contact with the workpiece, becomes long. As a result, the accumulation in resultant lost time, is considerable from the viewpoint of the measuring tasks of today, particularly in mass production systems. Although the digital indication type dimension measuring instrument provides an instantaneously readable, numerally indicated measured value differing from an analogue indication type dimension measuring instrument, the instant readability cannot be satisfactorily displayed if the displacement speed of the spindle is slowed to an unnecessary extent. Further, the speed of response tends to be decreased while the workpiece is moving.

SUMMARY OF THE INVENTION

The present invention has as its object the provision of a digital indication type dimension measuring instrument in which, even in a state other than the one where a spindle is dropped in the vertical direction, the spindle can be displaced to a workpiece to be measured at a suitable displacement speed.

To this end, the present invention contemplates that, in a digital indication type dimension measuring instrument in which a spindle having a measuring element is resiliently biased in one direction along the axial line thereof, the spindle is provided with a dashpot type shock absorbing mechanism using air as a pressure fluid and a displacement value of the spindle is converted into an electric signal and digitally indicated, the shock absorbing mechanism is provided with pressure adjusting means for releasing the pressure fluid to the atmosphere in accordance with the inclination (posture) of the spindle to adjust the pressure of the pressure fluid, whereby, for example, when the spindle is levelled, a shock absorbing action against the resilient biasing force is decreased and so forth as compared with the case where the spindle is in the erected state, so that a shock absorbing action suitable for the posture of the spindle can be attained. Here, the dashpot type shock absorbing mechanism refers to a shock absorbing means for relieving an abrupt motion, such as a cylinder, a piston or the like, including an air damper or the like.

DETAILED DESCRIPTION OF THE PREFERRED EMBODIMENT

Description will hereunder be given of one embodiment of the present invention with reference to the drawings.

Figure 1:
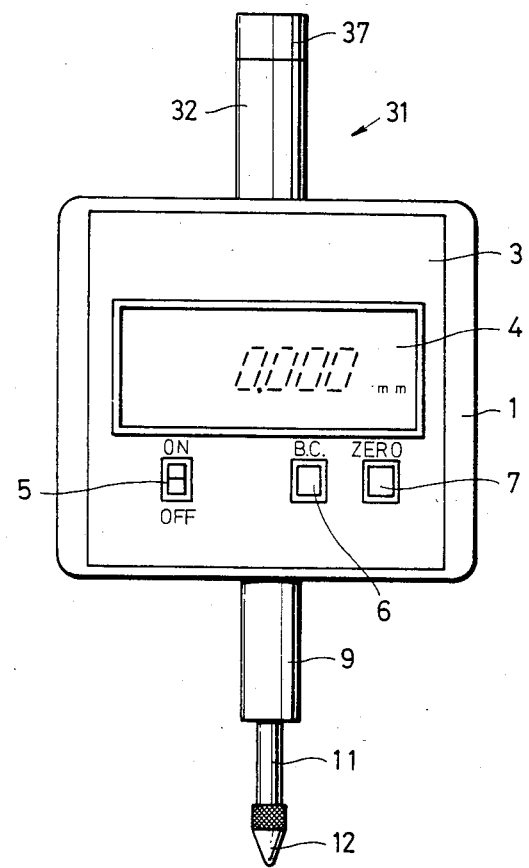
FIG. 1 is a front view showing the general arrangement of one embodiment of the digital indication type dimension measuring instrument according to the present invention.
Figure 2:
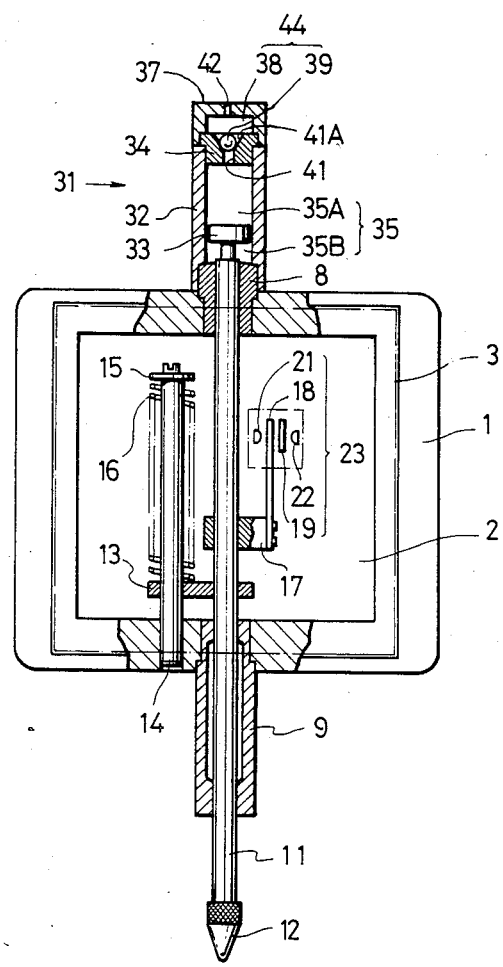
FIG. 2 is a frontview, partially cutaway, showing the above embodiment with a front cover being removed.

FIGS. 1 and 2 show the general arrangement of the digital indication type dimension measuring instrument according to the present invention. Referring to the drawings, a main body 1 is formed into a case having a hollow space 2 therein. This main body 1 is secured thereto with a front cover 3 for concealing the hollow space 2. The front cover 3 is provided thereon with a digital indication portion 4 for digitally indicating a measured value, a power switch 5, a battery check button 6, a zero set button 7 and the like.

The spindle 11 penetrates the main body 1 through a retainer tube 8 and a stem 9, and is supported by the main body 1 in a manner to be slidable on the axial line thereof. Furthermore, the spindle 11 is provided at the forward end thereof with a measuring element 12. Affixed to a predetermined position of the spindle 11 in the hollow space 2 is a guide piece 13 slidably coupled onto a guide rod 14. The guide rod 14 is affixed at the proximal end thereof to the main body 1 and disposed in parallel to the spindle 11 in the hollow space 2. Furthermore, a spring receiver 15 is affixed to the forward end of the guide rod 14. Confined between this spring receiver 15 and the guide piece 13 is a compression coil spring 16, which functions as a resilient biasing means, surrounding the guide rod 14. This spring 16 resilient biases the spindle 11 in one direction (downwardly in the drawing) along the axial line thereof. Affixed to a predetermined position of the spindle 11 in the hollow space 2 through a mount 17 is a main scale 18. On the other hand, affixed to the main body 1 at a position close to this main scale 18 is an index scale 19. A light emitting element 21 and a light receiving element 22 are affixed to the main body 1, interposing therebetween the both scales 18 and 19. Here, both scales 18, 19, the light emitting element 21 and the light receiving element 22 constitute a displacement detecting portion 23, which is a photoelectric encoder, in which a displacement value of the spindle 11 is converted into an electric signal, whereby the displacement value of the spindle 11 is digitally indicated in the digital indication portion 4.

Figure 3:
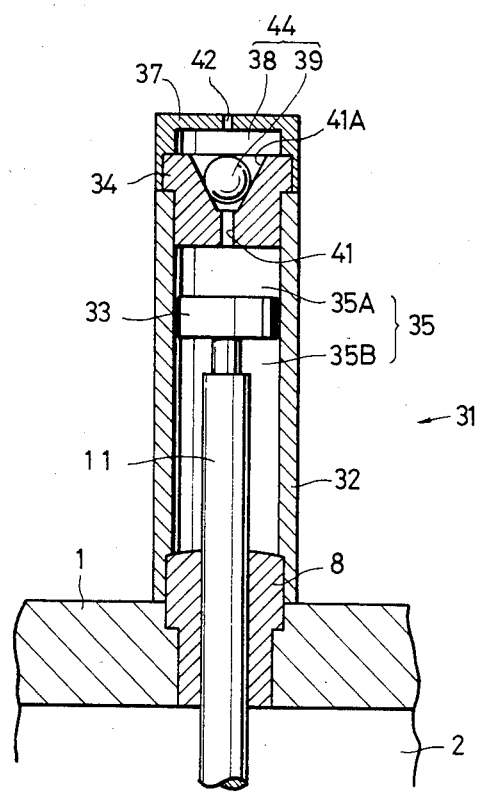
FIG. 3 is an enlarged sectional view showing the construction of the spindle in the erected state in the shock absorbing mechanism of the above embodiment.

The spindle 11 is provided at an end portion thereof opposite to the measuring element 12 with a dashpot type shock absorbing mechanism 31 using air as the pressure fluid (Refer to FIG. 3). This shock absorbing mechanism 31 has a cylinder 32 coupled and fixed onto the retainer tube 8, and slidably provided in this cylinder 32 is a piston 33 solidly secured to the spindle 11. A partition member 34 is provided at the free end portion of the cylinder 32 (at the upward end in FIGS. 2 and 3), and a pressure chamber 35 is formed in the cylinder 32 by this partition member 34. The pressure chamber 35 is constituted by a negative pressure chamber 35A for forming a negative pressure when the spindle 11 is displaced in accordance with the biasing force of the spring 16 and a positive pressure chamber 35B for forming a positive pressure when the spindle 11 is displaced as described above. Further, formed between the piston 33 and the cylinder 32 is a gap suitable for allowing the air as to be the pressure fluid to flow therethrough.

Affixed to the partition member 34 is a cap member 37 defining a valve box. Formed on the inner peripheral surface of this cap box 37 is a valve chamber 38, in which a ball 39, functioning as being a valve body, is movably retained. Furthermore, a communication hole 41 for communicating the pressure chamber 35 (the negative pressure chamber 35A) with the valve chamber 38 is formed through the partition member 34. This communication hole 41 is formed with a tapered surface 41A progressively enlarged from the side of the pressure chamber 35 toward the valve chamber 38. As shown in FIGS. 1 and 2, in the state where the spindle 11 is vertically erected, the ball 39 is dropped into this tapered surface 41A and retained therein, whereby the communication hole 41 is blocked by the ball 39. On the other hand, in the state where the measuring element is generally laid in the transverse direction and the spindle 11 is levelled, the ball 39 is dropped to the side of the cap member 37, i.e., the ball 39 is removed from the communication hole 41, whereby the communication hole 41 is opened.

Furthermore, the cap member 37 is formed therethrough with an open hole 42 communicating the valve chamber 38 with the atmosphere. In the state where the spindle 11 is levelled or rendered horizontal, the pressure chamber 35 is communicated with the atmosphere through the communication hole 41 and the open hole 42. Here, the valve chamber 38 and the ball 39, functioning as the valve body, constitute pressure adjusting means 44 for releasing the pressure fluid (air) in the pressure chamber 35 to the atmosphere in accordance with the angle of inclination of the spindle 11.

Description will now be given of the operation of this embodiment.

As shown in FIGS. 1 through 3, in the state where the spindle 11 is upright, a force for pushing the spindle downwardly in the drawings is constituted by gravity acting on the spindle 11 and the resiliency of the compression coil spring 16. In the upright state of the spindle 11 as described above, the ball 39 is dropped into the tapered surface 41A, whereby the communication hole 41 is blocked. In other words, the pressure chamber 35 is in the hermetically closed state similarly to the conventional dashpot type shock absorbing mechanism. In consequence, both the negative pressure chamber 35A and the positive pressure chamber 35B of the pressure chamber 35 act against the resiliency of the spring 16 and the gravity of the spindle 11.

Figure 4:
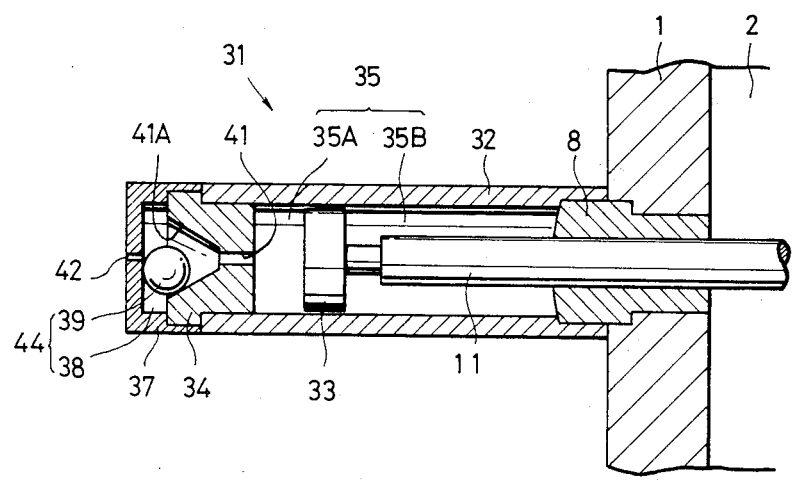
FIG. 4 is an enlarged sectional view showing the construction of the spindle in a levelled or horizontal state in the above shock absorbing mechanism.

On the other hand, in the state where the spindle 11 is levelled or rendered horizontal as shown in FIG. 4, the force for displacing the spindle 11 is formed only by the resiliency of the compression coil spring 16, because the gravity of the spindle 11 does not act. However, if the spindle 11 is levelled or rendered horizontal, the ball 39 is antomatically dropped and removed from the tapered surface 41A toward the side wall of the cap member 37, whereby the communication hole 41 is opened, so that the negative pressure chamber 35A is communicated with the atmosphere. In consequence, only the positive pressure chamber 35B acts against the resiliency of the spring 16, and the displacement speed of the spindle 11 is not decreased, even though the force for displacing the spindle 11 is limited to the resiliency of the spring 16.

The above-described embodiment can offer the following advantages.

Even in the state where the spindle 11 is upright or horizontal, the displacement speed of the spindle 11 can be made almost constant. In consequence, even when the measuring tasks are carried out in the state where the spindle 11 is horizontal, the instant readability of the digital indication type dimension measuring instrument can be satisfactorily displayed. Furthermore, the loss time in the measuring works caused by the decreased displacement speed of the spindle 11 can be eliminated and, even when the measuring tasks are repeated many times, the measuring tasks can be carried out quickly. Further, when the workpiece is moved, the speed of responce is not deteriorated.

The following is a specific example of the advantages obtained by this embodiment as compared with the conventional construction.

The example

The outer diameter of the piston 33 . . . 9 mm

The maximum gap between the piston 33 and the cylinder 32 . . . 60 μm

The outer diameters of the cylinder 32 and the cap member 37 . . . 12 mm

The diameter of the ball 39 . . . 4 mm

The inner diameter of the communication hole 41 . . . 2 mm

The angle of inclination of the tapered surface 41A . . . 60°

The inner diameter of the open hole 42 . . . 0.5 mm.

The conventional example

The specification thereof is identical with that of the above embodiment except that the pressure adjusting means 44 is not provided.

TABLE

| | Displacement speed of spindle (mm/s) | |
| --- | --- | --- |
| | Spindle erected | Spindle levelled |
| Example | 375 | 370 |
| Conventional example | 375 | 185 |

It becomes apparent from the results shown in this table that, according to this embodiment, the displacement speed of the spindle 11 can be made substantially constant irrespective of the posture of the spindle 11.

Furthermore, according to this embodiment, the automatic motion of the ball 39 in accordance with the change in the posture of the spindle 11 is utilized to open or block the communication hole 41, whereby there is no need for any particular operation to adjust the shock absorbing action of the shock absorbing mechanism 31, thus proving to be very convenient.

Furthermore, this embodiment is advantageous in that the communication hole 41 is opened or blocked by the ball 39 retained in the valve chamber 38 and so forth, so that the general arrangement is highly simplified, the manufacture is facilitated, the construction is durable and the operation is reliable.

Further, this embodiment is advantageous in that, in which direction or in what state the spindle 11 would be rendered horizontal, the ball 39 should be reliably removed from the tapered surface 41A (the communication hole 41), and, in which direction or in what state the spindle 11 would be rendered upright, the communication hole 41 should be reliably blocked by the ball 39. Moreover, it is possible to adjust the extent of opening of the communication hole 41 in accordance with the angle of inclination of the spindle 11.

In working, for example, a cover member, such as for example an openable flat plate or an abacus bead-shaped member may be used for the communication hole 41, replacing the ball 39. Furthermore, instead of retaining the valve body in the valve chamber, i.e., without providing the cap member 37, a cover member adapted to open or close the communication hole 41 in accordance with the posture of the spindle 11 may be provided on the cylinder 32 through a link mechanism. However, the arrangement according to the above embodiment is advantageous in that the construction is simplified, and moreover, even in what state the spindle 11 would be rendered horizontal, the ball 39 should be reliably removed from the communication hole 41 and so forth, so that the pressure adjusting action can be reliably effected.

Moreover, in the above embodiment, the displacement detection portion 23 has been constituted by the photoelectric encoder, however, the application of the invention need not necessarily be limited to this. Instead, a magnetic encoder or the like may be used. In short, any one which can electrically detect a displacement value of the spindle 11 will do. Furthermore, the resilient biasing means need not necessarily be the above-described compression coil spring 16, but, may be a tensile coil spring or the like.

As has been described hereinabove, the present invention can provide a digital indication type dimension measuring instrument in which, even in a state other than the one where a spindle 11 is dropped in the vertical direction, the spindle can be displaced to a workpiece to be measured at a suitable displacement speed.

What is claimed is:

1. In a digital indication type dimension measuring instrument, wherein a spindle having a measuring element is resiliently biased in one direction on the axial line thereof, said spindle is provided with a dashpot type shock absorbing mechanism using air as a pressure fluid, means is provided for converting a displacement value of said spindle into an electric signal and digitally indicating same, the improvement comprising wherein said shock absorbing mechanism is provided with pressure adjusting means for exhausting said pressure fluid to the atmosphere in accordance with the inclination of said spindle to adjust the pressure of said pressure fluid.

2. A digital indication type dimension measuring instrument as set forth in claim 1, wherein said shock absorbing mechanism includes means defining a pressure chamber, wherein said pressure adjusting means comprises: a valve chamber having an open hole communicated with said atmosphere and a communication hole communicated with said pressure chamber of said shock absorbing mechanism; and a valve body retained in said valve chamber for blocking said communication hole in a state where said spindle is vertically upright and opening said communication hole in a state where said spindle is horizontal.

3. A digital indication type dimension measuring instrument as set forth in claim 2, wherein said valve body is a ball movably retained in said valve chamber and wherein said communication hole is formed with a tapered surface into which said ball moves to close said hole and in said state where said spindle is vertically upright.

4. A digital indication type dimension measuring instrument as set forth in claim 3, wherein said tapered surface has such an angle of inclination that said ball is moved to open said communication hole when said spindle is inclined to a predetermined angle of inclination or more.

5. A digital inclination type dimension measuring instrument as set forth in claim 3, wherein the angle of inclination of said tapered surface is 60 degrees to the horizontal.

6. A digital inclination type dimension measuring instrument, comprising:
   a main body provided with an indication means for digitally indicating a measuring value, a spindle axially movably supported on said main body, biased in a predetermined direction through a biasing means and provided at the forward end thereof with a measuring element, a displacement detection means incorporated in said main body for detecting a movement value of said spindle in an axial direction, and a shock absorbing mechanism including a piston provided at the other end of said spindle and reciprocally received in a cylinder secured to said main body; and further, said shock absorbing mechanism being provided with a pressure adjusting means for adjusting the pressure of a pressure fluid in a pressure chamber when said spindle is inclined to a predetermined angle of inclination or more.

7. A digital indication type dimension measuring instrument as set forth in claim 6, wherein said shock absorbing mechanism includes a pressure chamber; wherein said pressure adjusting means comprises a valve chamber having an open hole communicated with the atmosphere and a communication hole communicated with said pressure chamber of said shock absorbing mechanism and a ball valve for blocking said communication hole in a state where said spindle is vertically upright to a state where said spindle is inclined to a predetermined angle of inclination and opening said communication hole when said spindle is inclined to an angle of inclination more than said predetermined angle; and wherein a portion of said communication hole, on which said ball valve is seated, is formed into a tapered surface enlarging in a direction away from said spindle.

8. A digital indication type dimension measuring instrument as set forth in claim 7, wherein the angle of inclination of said tapered surface is 60 degrees.

* * * * *